(12) United States Patent
Banerjee

(10) Patent No.: US 9,699,141 B2
(45) Date of Patent: Jul. 4, 2017

(54) METHOD AND APPARATUS FOR INTEGRATING SECURITY CONTEXT IN NETWORK ROUTING DECISIONS

(71) Applicant: Symantec Corporation, Mountain View, CA (US)

(72) Inventor: Deb Banerjee, Cupertino, CA (US)

(73) Assignee: Symantec Corporation, Mountain View, CA (US)

(*) Notice: Subject to any disclaimer, the term of this patent is extended or adjusted under 35 U.S.C. 154(b) by 265 days.

(21) Appl. No.: 13/856,229

(22) Filed: Apr. 3, 2013

(65) Prior Publication Data

US 2014/0304764 A1 Oct. 9, 2014

(51) Int. Cl.
*H04L 29/06* (2006.01)

(52) U.S. Cl.
CPC .......... *H04L 63/02* (2013.01); *H04L 63/0245* (2013.01)

(58) Field of Classification Search
CPC ......... H04L 63/02; H04L 63/18; H04L 63/20; H04L 63/105; H04L 63/0227; H04L 63/0428; G06F 21/6218
USPC ................................... 726/1, 2, 22; 370/392
See application file for complete search history.

(56) References Cited

U.S. PATENT DOCUMENTS

| 2008/0101367 A1* | 5/2008 | Weinman ....................... 370/392 |
| 2009/0183257 A1* | 7/2009 | Prahalad .......................... 726/22 |
| 2010/0071024 A1* | 3/2010 | Eyada ................. H04L 63/0263 726/1 |
| 2010/0132009 A1* | 5/2010 | Khemani et al. ................. 726/1 |
| 2012/0110641 A1 | 5/2012 | Parker et al. |

OTHER PUBLICATIONS

"Collaborative Trust-Based Shortest Secure Path Discovery in Mobile Ad Hoc Networks" by Seungtak Oh et al., Proceeding ICCS 2006 Proceedings of the 6th international conference on Computational Science—vol. Part II pp. 1089-1096.*
International Search Report for International (PCT) Patent Application No. PCT/US2014/032760, Aug. 7, 2014 (5 pages).
Written Opinion of the International Searching Authority for International (PCT) Patent Application No. PCT/US2014/0032760, Aug. 7, 2014 (6 pages).

* cited by examiner

*Primary Examiner* — Noura Zoubair
(74) *Attorney, Agent, or Firm* — Wilmer Cutler Pickering Hale and Dorr LLP

(57) ABSTRACT

An apparatus identifies a request from a user device to access data on a storage server. The apparatus determines a sensitivity level of response data for a response to the request, security context of the response, and a routing action to perform for the response by applying a policy to the sensitivity level of the response data and the security context of the response. The apparatus executes the routing action for the response.

17 Claims, 4 Drawing Sheets

US 9,699,141 B2

METHOD AND APPARATUS FOR INTEGRATING SECURITY CONTEXT IN NETWORK ROUTING DECISIONS

TECHNICAL FIELD

The present disclosure relates to network routing decisions, and more particularly, to integrating security context in network routing decisions.

BACKGROUND

An Enterprise, such as, a business organization, can store data that may have sensitive content. For example, Enterprise data may include confidential customer information, sensitive research documents, proprietary designs, etc. Enterprise users, such as Enterprise employees, may wish to access the Enterprise data remotely. For example, a user may be traveling and may use a tablet computer and a hotel's public network to access his or her Enterprise email account. The email may have sensitive Enterprise data. The Enterprise may wish to control the data flow of the sensitive data and may not want Enterprise users to access the sensitive data using a public network. Traditional solutions have implemented security agents on user devices to prevent unauthorized access to the sensitive data. Some user devices do not have the capability to run security agents to prevent the user devices from accessing the sensitive data. Other conventional solutions have servers or other network devices dedicated to monitoring and controlling data access. The implementation of additional servers and network devices can increase operational costs. Some traditional solutions use routers to determine network paths based on costs and availability. Typically, such routers do not have the intelligence to control which operations can performed, which users can perform the operations, and the data that can be used for performing the operations.

SUMMARY

In one implementation, an apparatus for integrating security context in network routing decisions is described. An exemplary apparatus may include a memory and a processing device that is coupled to the memory. In one embodiment, the apparatus identifies a request from a user device to access data on a storage server. The apparatus determines a sensitivity level of the data, security context of the request, and a routing action to perform for the request by applying a policy to the sensitivity level of the data and the security context of the request. The apparatus executes the routing action for the request.

In one implementation, the apparatus executes the routing action by selecting one or more router paths to use for a response to the request by applying the policy to the sensitivity level of the data and the securing context of the request. The apparatus sends the data to the user device using the one or more routers in the chosen route path. In one implementation, the apparatus selects one or more secure router paths based on network information stored in a data store that is coupled to the router. In one implementation, the apparatus executes the routing action by blocking the user device from accessing the data. In one implementation, the apparatus determines the sensitivity level of the data by performing a hash on a payload of the data to compute a hash value and querying data classification services that return the sensitivity level of the data using the hash value. In one implementation, the apparatus determines the security context of the request by identifying a security level of the user device associated with the request and identifying a security level associated with a destination network associated with the request. In one implementation, the security level of the user device and the security level associated with the destination network are stored in a data store that is coupled to the apparatus.

In addition, a non-transitory computer readable storage medium for integrating security context in network routing decisions is described. An exemplary non-transitory computer readable storage medium includes instructions that will cause a processing device to identify a request from a user device to access data on a storage server, determine a sensitivity level of the data and security context of the request, and determine a routing action to perform for the request by applying a policy to the sensitivity level of the data and the security context of the request. The processing device executes the routing action for the request.

Further, a method for integrating security context in network routing decisions is described. In one embodiment, a method comprises identifying a request from a user device to access data on a storage server, determining a sensitivity level of the data and security context of the request, determining a routing action to perform for the request by applying a policy to the sensitivity level of the data and the security context of the request, and executing the routing action for the request.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and apparatus for integrating security context in network routing decisions, according to various implementations. Implementations control, via a router, the flow of data based on the security context of a response to a request to access data. Examples of security context can include, and are not limited to, the sensitivity of the data in the response to the request, the security of the network associated with the response, the security of the user device to receive the request, etc. For example, if the response data is highly sensitive, and if the network and/or the user device are considered to be unsafe, the router may prevent the flow of the highly sensitive response data to the user device. Implementations of the present disclosure can use routers to automatically implement policies to control the flow of data by selecting a route based on the security context of the response. Implementation can select different routes for different responses. Implementations can control which operations can be performed in response to the request, which user devices and networks can be used to perform the operations, and what data can be used for performing the operations.

Figure 1:
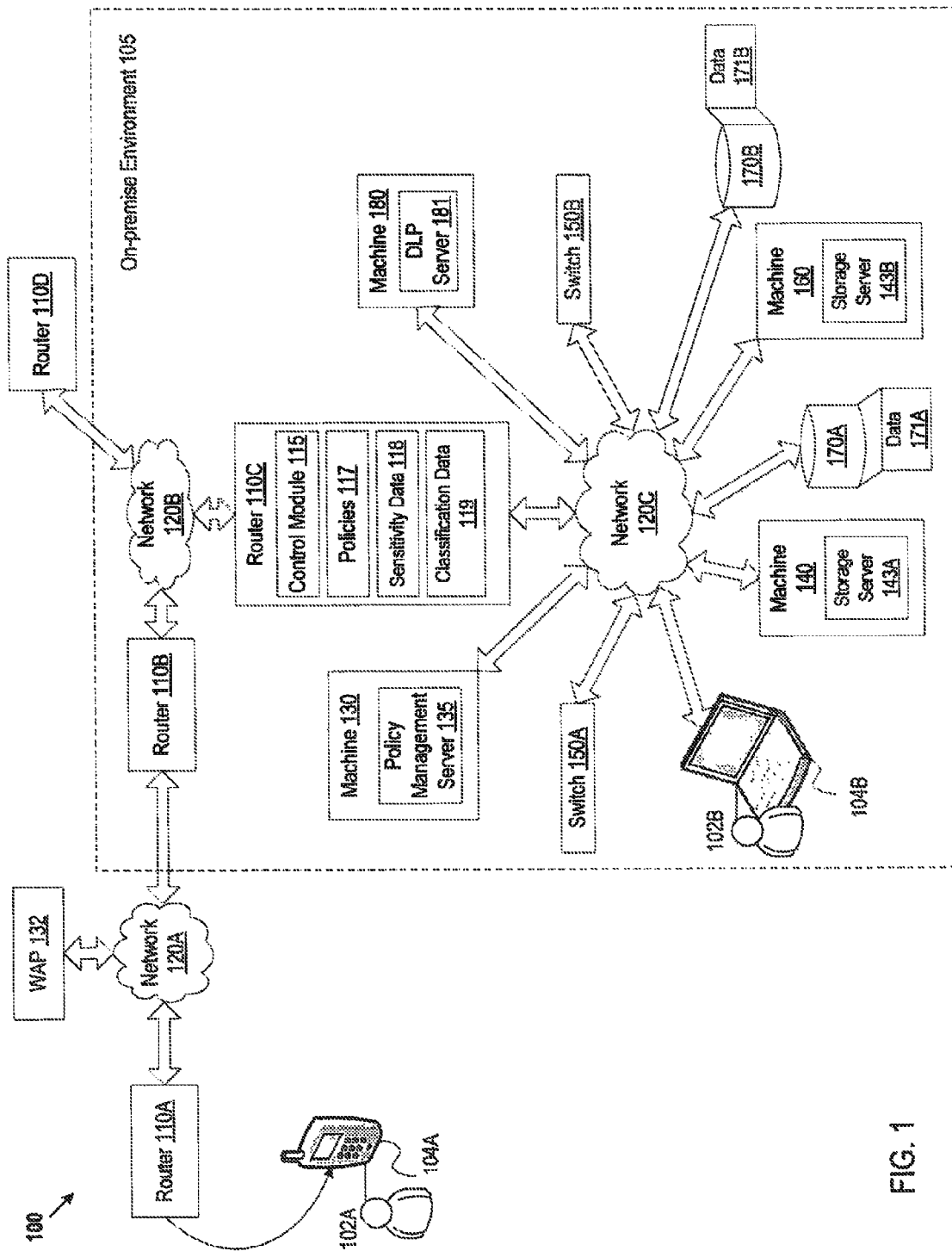
FIG. 1 illustrates example system architecture, in accordance with various implementations.

FIG. 1 is an example system architecture 100 in which implementations of the present disclosure can be implemented. The system architecture 100 can include one or more machines 130,140,160,180, one or more routers 110A-D, one or more switches 150A-B, and one or more user devices 104A-B connected via one or more networks 120A-C. The networks 120A-C can include one or more local area networks (LAN), one or more wireless networks, one or more mobile communications networks, one or more wide area networks (WAN), such as the Internet, or similar communication systems, or combinations of such. The networks 120A-C can include one or more networking and/or computing devices such as wired and wireless devices.

For example, the network 120C may be a private network. A private network is hereinafter referred to as an on-premise network. For example, an Enterprise may provide and manage an on-premise network 120C in an on-premise environment 105. An Enterprise can be an entity such as, and not limited to, any person, a business organization such as a corporation, an educational institution such as a college and university, etc. The networks 120A-B may be public networks. Network 120A may be a Wi-Fi network. Wi-Fi is a technology that allows an electronic device to exchange data wirelessly over a network. A user device 104A can be a device that can use Wi-Fi to connect to a network resource, such as the Internet, via a wireless access point proxy 132.

A wireless access point (WAP) proxy 132 allows the user device 104A to connect to a wired network using Wi-Fi, or related standards. The wireless access point proxy 132 can be hosted by any type of computing device including server computers, gateway computers, desktop computers, laptop computers, or similar computing device. The wireless access point proxy 132 can create a hotspot, which is a site that offers Internet access over a wireless local area network through the use of a router 110A connected to a link to an Internet service provider. Hotspots typically use Wi-Fi technology. Hotspots may be found in hotels, airports, coffee shops, retailers, and various other public establishments. The wireless access point proxy 132 may be provided by and maintained by a third party (e.g., hotels, airports, coffee shops, retailers, various other public establishments, etc.).

A user device 104A-B can be a computing device such as a desktop computer, a set-top box, a gaming console, a television, a portable computing device such as, and not limited to, mobile telephones, personal digital assistants (PDAs), portable media players, netbooks, laptop computers, an electronic book reader and the like.

The machines 140,160 can include a storage server 143A-B to store data 171A-B as files on storage devices (e.g., data stores 170A-B). The machines 140,160,180 can include, and are not limited to, any data processing device, such as a server computer, gateway computer, desktop computer, a laptop computer, a mainframe computer, a personal digital assistant, a handheld device or any other device configured to process data. The storage servers 143A-B can be coupled to the network 120C via one or more switches 150A-B.

The data stores 170A-B may be mass storage devices, such as magnetic or optical storage based disks, solid-state drives (SSDs) or hard drives. In one implementation, the system architecture 100 includes a distributed file system that may be a network attached storage file system that includes one or more machines 140,160 and one or more data stores 170A-B. The storage server 143A-B can manage access to the data 171A-B.

The user devices 104A-B can host one or more applications, which may create or request access to the data 171A-B via the storage servers 143A-B. An application can be any type of application including, for example, a web application, a desktop application, a browser application, etc. Examples of a request to access data 171A-B can include, and are not limited to, reading data, writing data, modifying data, etc.

One or more machines 180 can include one or more servers to provide services relating to the data 171A-B. Examples of services, can include, and are not limited to, data loss prevention (DLP), backup, archive, anti-virus, data governance, discovery, forensics, auditing, data sharing analysis, etc. For brevity and simplicity a DLP server 181 is used as an example of a server providing a service throughout this document. The DLP server 181 can generate sensitivity data 118 that describes the sensitivity level of the data 171A-B that is stored in the data stores 170A-B. For example, the sensitivity data 118 may describe that data 171A is highly sensitive data and that data 171B is not sensitive data. In one implementation, the DLP server 181 sends the sensitivity data 118 to the control module 115, and the control module 115 stores the sensitivity data 118 locally.

The machine 130 can include a policy management server 135 to define policies 117 relating to the data 171A-B. For example, a policy 117 may specify that highly sensitive data should be accessed using secure user devices and secure networks including secure route paths for data traffic. A router path includes network elements (e.g., routers, switches, etc.). A router path can change based on the selected network elements. The policy management server 135 can create the policies 117 from user (e.g., system administrator) input via user interface (UI) that is coupled to the policy manager server 135. The UI can be a graphical user interface (GUI), a command line interface, etc. In one implementation, the policy management server 135 sends the policies 117 to the control module 115, and the control module 115 stores the policies 117 locally.

When data is requested, for example, by a user device 104A-B, the Enterprise may wish to control the flow of data 171A-B based on the sensitivity of the data in the response and the security context of the response to the request. The security context of the response can include, for example, and is not limited to, the security of the user device to receive the response, security of the network associated with the response, etc. For example, an Enterprise user 102B may request access to data 171B using a user device 102B and an on-premise network 120C. Storage server 143A may generate a response that includes the data 171B. The router 110C may determine to send the response to the user device 102B using a router path via on-premise network 120C. In another example, an Enterprise user 102A may request access to data 171B using a user device 102A and a public network 120A. Storage server 143B may generate a response that includes data 171B. The router 11C may determine to prevent the response from being sent to the user device 102A using a router path via the public network 120A.

A software defined network is a network that includes elements (e.g., routers, switches, etc.) that can be configured to store third party policies and third party context data relating to the policies. For example, a router manufactured by Company-A can include an API (application programming interface) that allows Company-B, which may be the Enterprise, to store Company-B policies 117 and Company-B context data on the router. The router can be configured, via the API, to implement the policies 117 of Company-B. For example, network 120C can be a software defined network that includes one or more routers (e.g., router 110C) that can implement Enterprise policies 117. The router 110C can include a control module 115 to implement the policies 117 to control the flow of the response for the request based on the security context of the response. For example, a storage server (e.g., storage server 143A-B) can construct a response, which may include the requested data (e.g., Enterprise data 171A-B). The control module 115 can receive the response from the storage server and can determine whether to allow the data (e.g., data 171A) in the response to flow to user device (e.g., user device 104A) via a network (e.g., network 120A), and if so, which routers, router paths, switches (e.g., switches 150A-B), and/or networks to use for the data flow. The control module 115 can use the policies 117 and the sensitivity data 118 to make the determination. The control module 115 can make the determination based on the policies 117 of the Enterprise, the sensitivity level of response data (e.g., data 171A), the security level that is associated with user device 104A that is to receive the response, and the security level that is associated with the network 120A that may be associated with the response. For example, the control module 115 may determine that the response include data 171A that is highly sensitive, that the user device 102A that is to receive the response is a smart phone and is classified as an insecure device type, and that the network 120A that is to be used to deliver the response is a public Wi-Fi hotspot and is classified as an insecure network type. The policies 117 may specify that the control module 115 should not allow the response data (e.g., data 171A) to flow to the user device 102A. In another example, the policies 117 may allow the response data (e.g., data 171A) to flow to a secure user device using a secure network, one or more secure router paths, and secure network elements (e.g., routers, switches). For example, the control module 115 may determine that user device 104B is a desktop computer running security agents (e.g., DLP agents, anti-virus agents, etc.), and that the network 120C is a secure on-premise network, and the control module 115 may allow response data (e.g., data 171A) to flow to user device 104B via the network 120C, and a router path that includes router 110C and switch 150A.

The policy management server 135 can create classification data 119 that assigns a security classification to the various types of networking resources (e.g., routers 110A-D, switches 150A-B, networks 120A-C, user devices 104A-B, etc.) in the system architecture 100. For example, the classification data 119 may classify smart phones and tablet computers as insecure devices. In another example, the classification data 119 may classify public networks as insecure networks. In on implementation, the policy management server 135 sends the classification data 119 to the control module 115, and the control module 115 stores the classification data 119 locally.

For example, an application in a user device 104A can request access to data 171A. The request is transmitted from the user device 104A through WAP 132 and routers (e.g., router 110A, router 110B, router 110C) to the storage server 143A that manages the data 171A. The storage server 143A can construct a response that includes the network payload (e.g., data 171A) for the request. A network packet consists of control information and user data (e.g., data 171A) (also known as network payload). The router 110C can receive the response and can determine whether to route the response to the user device 104A or to prevent the response from being sent to the user device 104A based on the sensitivity of the response data (e.g., network payload data 171A), security context of the response, and the policies 117. The control module 115 can use the locally stored sensitivity data 118 to determine the sensitivity level of the network payload (e.g., data 171A) in the response data. The control module 115 can use the locally stored classification data 119 to determine the security level that is associated with the user device 104A, the network 120A, and the routers (e.g., router 110A and router 110B) in various router paths, and networks (e.g., network 120B) that are coupled to the network 120A. The control module 115 can locally store data that identifies the type of user device that is to receive the response and the type of network that is associated with the response.

The control module 115 may determine that the network payload (e.g., data 171A) in the response data is highly sensitive, that the user device 104A is a smart phone that is classified as an insecure device, that router 110A in the router paths is classified as insecure, and that network 120A is a public network that is classified as an insecure network. The control module 115 may determine that network 120B and router 110B in a router path are secure. One of the locally stored policies 117 on the router 110D may indicate that highly sensitive data can flow to user devices that are secure and via secure networks, secure routers in secure router paths, and the control module 115 may block the flow of response data (e.g., data 171A) to the user device 104A since network 120, router 110A and user device 104A are not secure. Alternatively the control module 115 may choose, based on one or more policies 117, to encrypt the response data (e.g., data 171A) using strong keys.

In one implementation, the control module 115 can control the data flow using routers in various geographies (e.g., cities, states, countries, etc.). For example, the control module 115 may be coupled to router 110D that resides in Japan. The classification data 119 can include data that classifies the routers as secure or insecure based on geography. The control module 115 can control the data flow using routers that are secure and may avoid routers in hostile geographies. A hostile geography is one that is prone to data attacks, data interception, etc.

Figure 2:
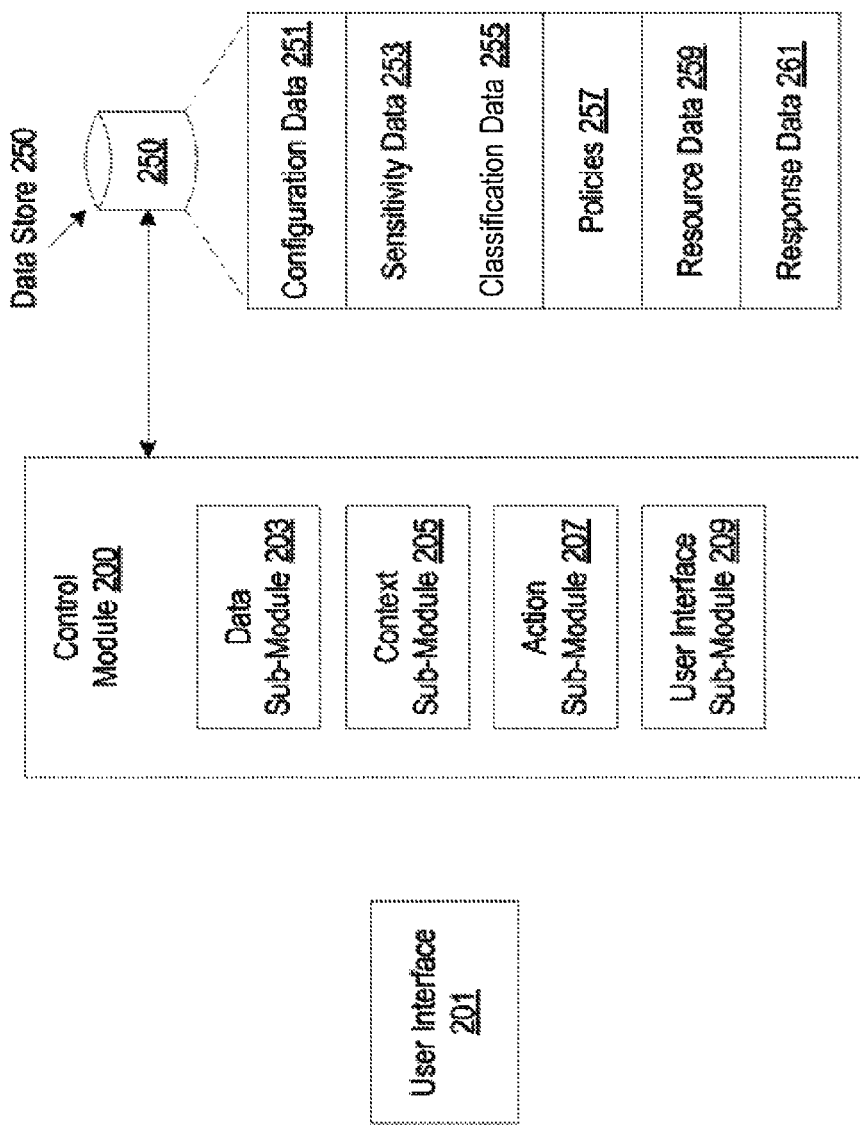
FIG. 2 is a block diagram of an implementation of a control module.

FIG. 2 is a block diagram of one implementation of a control module 200. The control module 200 may be the same as the control module 115 in a router 110C of FIG. 1. The control module 200 can include a data sub-module 201, a context sub-module 205, an action sub-module 207, and a user interface sub-module 209. The sub-modules can be combined together or separated in further sub-modules, according to a particular implementation.

The control module 200 can be coupled to one or more data stores 250 that store data, such as, and not limited to, configuration data 251, sensitivity data 253, classification data 255, policies 257, and resource data 259. In one implementation, the data sub-module 203 receives the data (e.g., configuration data 251, sensitivity data 253, classification data 255, policies 257, and resource data 259, etc.) from one or more systems (e.g., policy management server, DLP server, etc.) and stores the data in the data store 250. In one implementation, the data sub-module 203 receives user input via a user interface (UI) 201 that is generated by the user interface (UI) sub-module 209 to define and/or update the data (e.g., configuration data 251, sensitivity data 253, classification data 255, policies 257, and resource data 259, etc.) via the UI 201. The UI 201 can be a graphical user interface (GUI), a command line interface, etc.

The sensitivity data 253 can describe sensitivity levels for data (e.g., files) that are included in responses to requests and are stored in one or more data stores. Various sensitivity identifiers can be used to describe the sensitivity level. For example, sensitivity levels can include, and are not limited to, 'sensitive-high', 'sensitive-medium', and 'sensitive-low.' In another example, sensitivity levels can include, and are not limited to, 'sensitive-1', 'sensitive-2', and 'sensitive-n', where a scale may represent a degree of sensitivity.

When data is requested, for example, by a user device, the request is routed through the router to a storage server that manages the requested data. The context sub-module 205 can store response data 261 for the request in the data store 250. Examples of response data can include, and is not limited to, a user device identifier indicating the type of user device that is to receive a response for the request, an IP (internet protocol) address, etc.

When the storage server receives the request, the storage server can create a response for the request and attempt to send the response to the user device through the control module 200 in a router. The response data can include the requested data. The context sub-module 205 can determine the security context for the response. Examples of security context can include, and are not limited to, the sensitivity level of the response data, the security level of the user device that is to receive the response, the security level of the network elements (e.g., router paths, routers, switches, etc.) that are associated with the response, and the security level of the destination network that is associated with the response. For example, the context sub-module 205 can receive a response from the storage server that includes the network payload (e.g., the requested file). The context sub-module 205 can determine the sensitivity level of the network payload (e.g., file). The context sub-module 205 can perform a hash function on the network payload to compute a hash value. The configuration data 251 can specify which hash function the context sub-module 205 should use. The context sub-module 205 can use the hash value as a key to locate the sensitivity level for the network payload (e.g., file) in the sensitivity data 253, for example, by querying a data classification service. The data classification service can be hosted by a server computer system in an Enterprise environment (e.g., on-premise environment 105 in FIG. 1). For example, the response may include a network payload of File-2839758, which may be classified as 'sensitive-high'.

The context sub-module 205 can use the classification data 255 to determine the security level of the user device, network elements (e.g., routers, switches, etc.) to make router paths, and networks, that are associated with the sending the response to the user device. The classification data 255 can include security levels that are assigned to various types of network elements (e.g., user devices, routers, switches, networks, etc.). For example, the classification data 255 may assign smart phones and tablet computers as insecure user devices, public networks as insecure networks, routers and switch in hostile geographies as insecure network elements, etc.

The action sub-module 207 can apply one or more policies 257 to the security context for the response to determine a routing action to perform to control the flow of data for the response. The policies 257 can define the type (e.g., highly sensitive, moderately sensitive, not sensitive) of response data that can be accessed, the types of user devices that can be used to access the response data, the types of networks that can be used to transmit and/or access the response data, and/or the types of network elements (e.g., routers, switches, etc.) and the types of router paths that can be used to transmit and/or access the response data. For example, a policy may specify that highly sensitive response data should be transmitted to a user device using secure network elements in secure router paths, and secure networks. The routing action can specify, for example, what type of user device, router, switch, router path, and/or network to use to communicate a response for the request and the type of access to grant for the response data, if any.

The action sub-module 207 can use the resource data 259 to select the one or more network resources (e.g., routers, switches, etc.) and/or one or more router paths to use to perform the routing action. For example, the routing action may be to allow the flow of response data to the user device using one or more secure routers and switches in particular router paths and networks. The resource data can include, for example, and is not limited to, a list of routers, switches, router paths, networks, etc., that are secure, insecure, available, unavailable, encrypted, private, public, in a hostile geography, and service fees that may associated with the routers, switches, networks, etc. For example, the resource data 259 may describe that Router-3894728 is part of a router path in a hostile geography. The action sub-module 207 may determine from the resource data 259 which are the secure routers, switches, and/or networks to select from and can select one or more of the secure routers, switches, router paths, and/or networks.

The action sub-module 207 can use the selected routers, switches, and/or networks to send the response to the request. The action sub-module 207 can generate response instructions and send the response instructions to the next router in the data path. The response instructions can describe which routers, switches, and/or networks should be used to respond to the request. For example, the action sub-module 207 may allow data to flow from the United States to India and may have selected a Router-3489728 in Japan as the next router in the data flow path. The action sub-module 207 can send instructions to Router-3489728 that the flow of data for the request should use network routes that consist of one or more routers in China and one or more routers in India.

The data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 3:
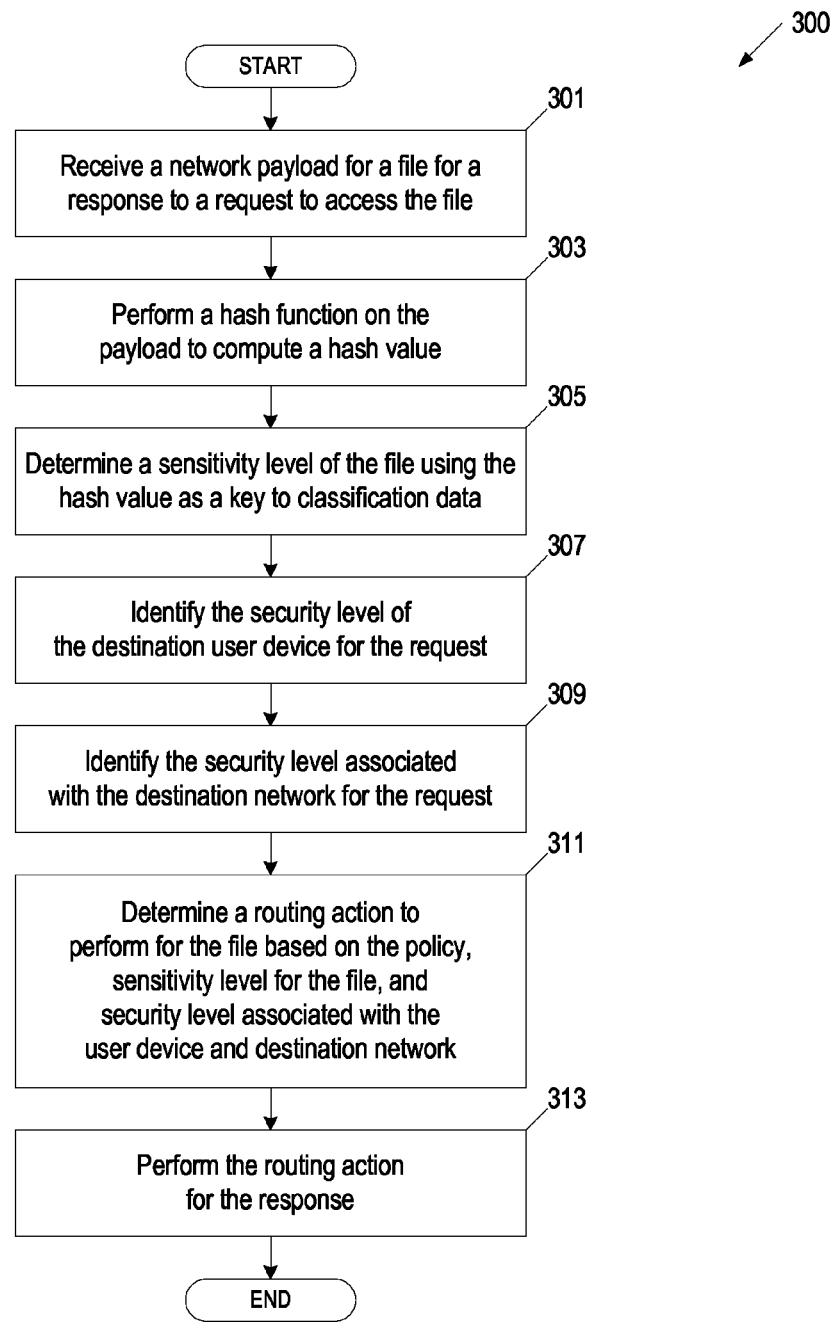
FIG. 3 is a flow diagram illustrating an implementation for a method for integrating security context in network routing decisions.

FIG. 3 is a flow diagram of an implementation of a method 300 for integrating security context in network routing decisions. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a control module 115 in a router 110C of FIG. 1.

At block 301, the router receives a network payload for data, such as a file, in response to a request to access the data (e.g., file). An application in a user device can request access to data (e.g., file). The application can be any type of application including, for example, a web application, a desktop application, a browser application, etc. In response to the request, the storage server can send the network payload (e.g., file) to the router to route to the user device.

At block 303, when the router receives the network payload in the response data from the storage server, the router performs a hash function on the network payload to compute a hash value. The hash function can be defined in configuration data that is stored in a data store that is coupled to the router. At block 305, the router determines a sensitivity level of the network payload (e.g., file) using the hash value as a key to sensitivity data. The router can use the hash value to determine the sensitivity level for the network payload (e.g., file). For example, the router can use the hash value to query a classification server for the sensitivity level for the network payload. The sensitivity data can indicate whether the file is, for example, and not limited to, "highly-sensitive", "moderately-sensitive", etc.

At block 307, the router identifies the security level of the destination user device for the response. The router can be coupled to a data store that stores classification data for various types of user devices. For example, the classification data may classify smart phones as insecure devices, tablet computers as insecure devices, laptops that run security agents as secure devices, desktops that run security agents as secure devices, etc. The router can determine the type of user device that is associated with the response from the initial request from the user device. For example, the request may include a string that contains the user device information that identifies the type of user device (e.g., smart phone) that is requesting the data (e.g., file).

At block 309, the router identifies the security level of the destination network for the response. The router can be coupled to a data store that stores classification data for various types of networks and network elements. For example, the classification data may classify one or more wireless networks as insecure networks, one or more on-premise networks as secure networks, one or more on-premise networks as insecure networks, network elements in hostile geographies as insecure network elements, etc. The router can determine the type network that is associated with the response from an IP (internet protocol) address in the response. For example, the response may include an IP address of the destination user device that is to receive the response. The server can determine from the IP address the type of network that is associated with the response and can use the classification data to determine the security level that is assigned to the network type.

At block 311, the router determines a routing action to perform for the response by applying one or more policies to the sensitivity level of the network payload (e.g., file) in the response data and the context data (e.g., security level of the user device, security level of the network, etc.) for the response. For example, a policy may specify that any response that contains highly-sensitive data and is addressed to an insecure device (e.g., smart phone) using an insecure network (e.g., public network) should be denied. In another example, a policy may specify that any response that contains highly-sensitive data and is addressed to a secure device (e.g., laptop) using a secure network (e.g., secure on-premise network) should be granted. In another example, a policy may specify that any response that contains non-sensitive data and is addressed to an insecure or secure device using an insecure or secure network should be granted. In other examples, policies may specify that the most cost effective router path(s), most available router path(s), most secure router path(s), etc. should be used to deliver data for a request.

At block 313, the router performs the routing action for the response. For example, the router may prevent the response from being delivered by blocking any sensitive data in the response from being transmitted to the user device. In another example, the router may grant access to the response data by selecting a secure router on a secure router path to use for transmitting the response data to the user device. The router can access resource data that is stored in the data store to determine which routers are secure or insecure routers and which router paths are secure and insecure. In one implementation, the router selects a secure router that is the closest in proximity to the user device. The router can create instructions that can specify the type of network elements (e.g., routers, switches, etc.) that should be used for the response.

Figure 4:
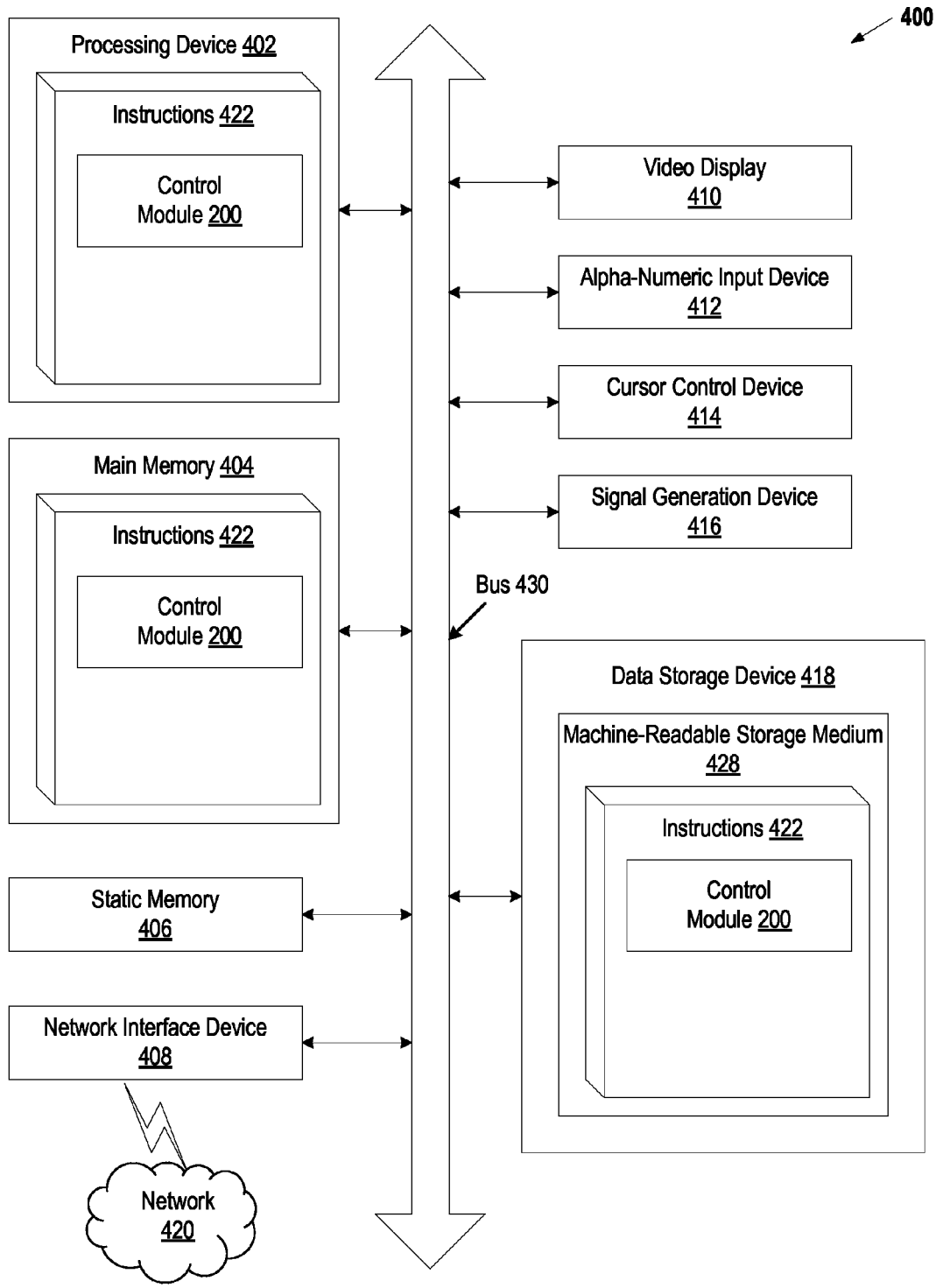
FIG. 4 is a block diagram of an example computer system that may perform one or more of the operations described herein.

FIG. 4 illustrates an example machine of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-readable storage medium 428 (also known as a computer-readable medium) on which is stored one or more sets of instructions 422 or software embodying any one or more of the methodologies or functions described herein. The instructions 422 may also reside, completely or at least partially, within the main memory 404 and/or within the processing device 402 during execution thereof by the computer system 400, the main memory 404 and the processing device 402 also constituting machine-readable storage media.

In one implementation, the instructions 422 include instructions for a control module (e.g., control module 200 of FIG. 2) and/or a software library containing methods that call modules in a security policy module and/or storage network path module. While the machine-readable storage medium 428 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "selecting" or "sending" or "blocking" or "performing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:

identifying a request from a user device to access data on a storage server;

determining, by a router, a sensitivity level of response data for a response to the request, wherein the sensitivity level is one sensitivity level from a scale of at least three sensitivity levels and wherein determining the sensitivity level of the response data further comprises performing a hash on a payload of the response data to compute a hash value and querying a locally stored classification database using the hash value to receive the sensitivity level of the response data;

determining, by the router, security context of the response, wherein the user device is to receive the response, wherein the security context comprises a security level of the user device to receive the response, a security level of a destination network associated with the response, and a security level of a network device associated with the response and wherein the security levels are respectively determined based on a type of the user device, a type of the destination network, and a type of the network device;

determining, by the router, a routing action to perform for the response by applying a policy to the sensitivity level of the response data and the security context of the response, wherein the policy is stored locally by the router; and executing, by the router, the routing action for the response, wherein executing the routing action comprises selecting, based on the sensitivity level of the response data, the security context of the response, and resource data stored locally by the router, one or more router paths for sending the response to the user device if the user device is not blocked from accessing the response data, wherein:

the resource data comprises at least one of a list of routers, switches, and router paths that are secure or insecure, a list of routers, switches, and router paths that are available or unavailable, a list of routers, switches, and router paths that are private or public, a list of routers, switches, and router paths that are located in a hostile geography, and a list of routers, switches, and router paths that have fees associated with their use;

when the sensitivity level of the response data is the highest sensitivity level on the scale of sensitivity levels, the selected router path consists of secure router paths and secure devices including a secure router that is closest in proximity to the user device; and when the sensitivity level of the response data is another sensitivity level on the scale of sensitivity levels, the selected router path is selected to provide a most secure router path.

2. The method of claim 1, wherein executing the routing action comprises:
sending the response data to the user device using one or more routers in the one or more router paths.

3. The method of claim 1, wherein selecting the one or more router paths comprises:
selecting one or more secure router paths based on network information stored in a data store coupled to the router.

4. The method of claim 1, wherein executing the routing action comprises:
blocking the user device from accessing the response data.

5. The method of claim 1, wherein determining the security context of the response comprises: identifying a security level of the user device to receive the response; and identifying a security level associated with a destination network associated with the response, wherein the security level of the user device and the security level associated with the destination network are stored locally by the router.

6. The method of claim 5, wherein the security level of the user device and the security level associated with the destination network are stored in a data store that is coupled to the router.

7. An apparatus comprising:
a memory; and a processing device, coupled with the memory, to:
identify a request from a user device to access data on a storage server;
determine a sensitivity level of response data for a response to the request, wherein the sensitivity level is one sensitivity level from a scale of at least three sensitivity levels and wherein determining the sensitivity level of the response data further comprises performing a hash on a payload of the response data to compute a hash value and querying a locally stored classification database using the hash value to receive the sensitivity level of the response data;
determine security context of the response, wherein the user device is to receive the response, wherein the security context comprises a security level of the user device to receive the response, a security level of a destination network associated with the response, and a security level of a network device associated with the response and wherein the security levels are respectively determined based on a type of the user device, a type of the destination network, and a type of the network device;
determine a routing action to perform for the response by applying a policy to the sensitivity level of the response data and the security context of the response, wherein the policy is stored locally by the apparatus; and
execute the routing action for the response, wherein executing the routing action comprises selecting, based on the sensitivity level of the response data, the security context of the response, and resource data stored locally by the apparatus, one or more router paths for sending the response to the user device if the user device is not blocked from accessing the response data, wherein:

the resource data comprises at least one of a list of routers, switches, and router paths that are secure or insecure, a list of routers, switches, and router paths that are available or unavailable, a list of routers, switches, and router paths that are private or public, a list of routers, switches, and router paths that are located in a hostile geography, and a list of routers, switches, and router paths that have fees associated with their use;

when the sensitivity level of the response data is the highest sensitivity level on the scale of sensitivity levels, the selected router path consists of secure router paths and secure devices including a secure router that is closest in proximity to the user device; and when the sensitivity level of the response data is another sensitivity level on the scale of sensitivity levels, the selected router path is selected to provide a most secure router path.

8. The apparatus of claim 7, wherein executing the routing action comprises:
sending the response data to the user device using one or more routers in the one or more router paths.

9. The apparatus of claim 7, wherein selecting the one or more router paths comprises: selecting one or more secure router paths based on network information stored in a data store coupled to the apparatus.

10. The apparatus of claim 7, wherein executing the routing action comprises:
blocking the user device from accessing the response data.

11. The apparatus of claim 7, wherein determining the security context of the response comprises:
identifying a security level of the user device to receive the response; and
identifying a security level associated with a destination network associated with the response, wherein the security level of the user device and the security level associated with the destination network are stored in the memory.

12. A non-transitory computer readable storage medium including instructions that, when executed by a processing device, cause the processing device to perform operations comprising:
identifying a request from a user device to access data on a storage server;
determining, by the processing device, a sensitivity level of response data for a response to the request, wherein the sensitivity level is one sensitivity level from a scale of at least three sensitivity levels and wherein determining the sensitivity level of the response data further comprises performing a hash on a payload of the response data to compute a hash value and querying a locally stored classification database using the hash value to receive the sensitivity level of the response data;

determining, by the processing device, security context of the response, wherein the user device is to receive the response, wherein the security context comprises a security level of the user device to receive the response, a security level of a destination network associated with the response, and a security level of a network device associated with the response and wherein the security levels are respectively determined based on a type of the user device, a type of the destination network, and a type of the network device;

determining, by the processing device, a routing action to perform for the response by applying a policy to the sensitivity level of the response data and the security context of the response, wherein the policy is stored locally by the processing device; and executing, by the processing device, the routing action for the response, wherein executing the routing action comprises selecting, based on the sensitivity level of the response data, the security context of the response, and resource data stored locally by the processing device, one or more router paths for sending the response to the user device if the user device is not blocked from accessing the response data, wherein:

the resource data comprises at least one of a list of routers, switches, and router paths that are secure or insecure, a list of routers, switches, and router paths that are available or unavailable, a list of routers, switches, and router paths that are private or public, a list of routers, switches, and router paths that are located in a hostile geography, and a list of routers, switches, and router paths that have fees associated with their use;

when the sensitivity level of the response data is the highest sensitivity level on the scale of sensitivity levels, the selected router path consists of secure router paths and secure devices including a secure router that is closest in proximity to the user device; and when the sensitivity level of the response data is another sensitivity level on the scale of sensitivity levels, the selected router path is selected to provide a most secure router path.

13. The non-transitory computer readable storage medium of claim 12, wherein executing the routing action comprises: sending the response data to the user device using one or more routers in the one or more router paths.

14. The non-transitory computer readable storage medium of claim 12, wherein selecting the one or more router paths comprises: selecting one or more secure router paths based on network information stored in a data store coupled to the processing device.

15. The non-transitory computer readable storage medium of claim 12, wherein executing the routing action comprises: blocking the user device from accessing the response data.

16. The non-transitory computer readable storage medium of claim 12, wherein determining the security context of the response comprises: identifying a security level of the user device to receive the response; and identifying a security level associated with a destination network associated with the response, wherein the security level of the user device and the security level associated with the destination network are stored locally by the processing device.

17. The non-transitory computer readable storage medium of claim 12, wherein the security level of the user device and the security level associated with the destination network are stored in a data store that is coupled to the processing device.

* * * * *